US006859029B2

(12) United States Patent
Yamanaka et al.

(10) Patent No.: US 6,859,029 B2
(45) Date of Patent: Feb. 22, 2005

(54) SYSTEM AND METHOD FOR MONITORING HIGH-FREQUENCY CIRCUITS

(75) Inventors: Kazunori Yamanaka, Kawasaki (JP); Isao Nakazawa, Kawasaki (JP); Masafumi Shigaki, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/625,740

(22) Filed: Jul. 24, 2003

(65) Prior Publication Data

US 2004/0119480 A1 Jun. 24, 2004

(30) Foreign Application Priority Data

Aug. 6, 2002 (JP) ....................................... 2002-228121

(51) Int. Cl.[7] ................................................ G01S 3/02

(52) U.S. Cl. ..................... 324/76.56; 324/637; 505/160

(58) Field of Search ........................... 324/76.11, 76.56, 324/637; 333/116, 993, 122; 342/70; 372/22; 505/160; 702/57, 66

(56) References Cited

U.S. PATENT DOCUMENTS

| | | | | |
|---|---|---|---|---|
| 4,642,571 A | * | 2/1987 | Minami et al. | 327/181 |
| 5,052,183 A | * | 10/1991 | Koscica et al. | 62/51.1 |
| 6,590,471 B1 | * | 7/2003 | Scharen et al. | 333/99 S |
| 6,636,816 B1 | * | 10/2003 | Dvorak et al. | 702/66 |
| 2004/0041655 A1 | * | 3/2004 | Kai et al. | 333/99 S |
| 2004/0160291 A1 | * | 8/2004 | Antkowiak et al. | 333/116 |

FOREIGN PATENT DOCUMENTS

| | | |
|---|---|---|
| JP | 11-027015 | 1/1999 |
| JP | 2001-036155 | 2/2001 |
| JP | 2002-064312 | 2/2002 |

* cited by examiner

*Primary Examiner*—N. Le
*Assistant Examiner*—Walter Benson
(74) *Attorney, Agent, or Firm*—Arent Fox, PLLC

(57) ABSTRACT

A monitoring system for high-frequency circuits which minimizes the insertion loss of additional monitoring circuits while requiring only a small space. An input coupler is placed at the input of a high-frequency circuit whose frequency response is to be monitored. The input coupler has a space where a given high-frequency probing signal can propagate, and it combines this propagating signal with a given electrical input signal. The combined signal is processed by the high-frequency circuit, and the resulting signal is supplied to an output coupler. The output coupler has a space for propagation of a high-frequency probing signal component contained in the received combined signal. The output coupler extracts this propagating signal component for the purpose of monitoring.

22 Claims, 4 Drawing Sheets

SYSTEM AND METHOD FOR MONITORING HIGH-FREQUENCY CIRCUITS

CROSS-REFERENCE TO RELATED APPLICATIONS

This application is based upon and claims the benefit of priority from the prior Japanese Patent Application No. 2002-228121, filed on Aug. 6, 2002, the entire contents of which are incorporated herein by reference.

BACKGROUND OF THE INVENTION

1. Field of the Invention

The present invention relates to a system and method for monitoring a high-frequency circuit that operates at low temperatures to handle electrical signals in the spectral range of quasi-microwaves, microwaves, or millimeter waves. More particularly, the invention pertains to a monitoring system, as well as to a monitoring method therefor, that observes variations in the frequency response of a high-frequency circuit with minimum insertion loss.

2. Description of the Related Art

Recent years have seen an increased demand for high-quality mobile network systems and satellite communications systems to meet the needs for wideband data transport of videos and images with better quality. To achieve the purpose, those communications systems use high frequency bands such as quasi-microwaves, microwaves, or millimeter waves. As one of the constituent technologies, low-loss high-frequency components (e.g., communications filter products) with small size and light weight will certainly play an essential role in the system development. Those circuits should handle high-frequency signals in the spectral range mentioned above. One requirement in this aspect is that the communications system has to incorporate some kind of monitoring and correction mechanism, so that the system will be able to check itself as to whether each circuit has an intended frequency response, and correct itself if necessary.

High-frequency circuits used in such a communications system include passive components using oxide superconductors designed for operation at cryogenic temperatures as low as several tens of kelvins (K). Think of, for example, a high-frequency analog and/or digital circuit that operates at 90 K or below. The following shows several methods and techniques used in observing the frequency response of this kind of circuit.

(1) The frequency response of a circuit of interest is directly measured in an experimental setup with a signal generator and a spectrum analyzer. Specifically, directional couplers, isolators, power distributors, and other necessary instruments are connected to the input and output of the circuit under test in a way suitable for each specific circuit configuration. The frequency response is identified by sweeping the output frequency of the signal generator within an intended frequency range while making the spectrum analyzer track that frequency sweep.

(2) The frequency response is measured in a similar way, but using a network analyzer in which both a signal oscillator and spectrum analyzer are integrated.

(3) In the case the circuit of interest has no particular inputs, its output signal is observed with a spectrum analyzer. For this purpose, a directional coupler or signal distributor is used to split a part of the output signal.

(4) Instead of using a spectrum analyzer, a sampling oscilloscope is attached to the circuit to observe its output in the time domain. This method is applicable if the frequency range is ten-odd gigahertz or below.

(5) Instead of using an analog signal generator, a digital signal generator is attached to the circuit. This configuration is applied when the circuit of interest handles digital input signals.

(6) The output of the high-frequency circuit is observed through a directional coupler, signal distributor, or other necessary circuit.

(7) A test signal is entered to the circuit through a directional coupler or other appropriate component placed at the input port of the circuit.

Typically, in any of the above cases (1) to (7), the high-frequency circuit of interest is located in a cryostat for operation in a low temperature environment. On the other hand, the attachments (e.g., couplers and distributors) are placed outside the cryostat, meaning that they are set in an environment at room temperature or near room temperature.

As an example of a passive circuit using oxide superconductive material, let us consider a planar circuit (e.g., microstrip lines, coplanar circuit) with a copper-oxide superconductive film formed on a substrate. This type of construct is used in high-frequency filters, for instance, and copper-oxide high-temperature superconductors are suitable material for the film because they are known to have a good crystallinity and show less energy loss (or high Q) in quasi-microwave and microwave applications, compared to ordinary materials including copper, silver, gold, aluminum, or others that exhibit high electrical conductivity. Further, the circuit may be placed in an ultra-low temperature environment to increase the conductivity, while there are some problems that have to be solved before it is put into practical use. That is, theoretically, copper-oxide high-temperature superconductors are expected to show a better performance than ordinary conductors in millimeter band and above (i.e., 0.3 THz and higher in the frequency domain) if it is cooled down to near the liquid helium (LHe) temperature, which is 4.2 K.

In the above section, we have discussed high-frequency circuits that handle electrical signals with quasi-microwave, microwave, or millimeter wave components, operate at cryogenic temperatures under 100 K, and have a transmission line to carry a signal over a conductor where electromagnetic fields concentrate. The frequency response of such circuits can be monitored by using the techniques (1) to (7) described above. They are, however, for use in laboratory-level systems. While a packaged high-frequency circuit can fit in a space of several to several hundred cubic centimeters, the entire system including circuit analysis devices is as large as several to several hundred liters typically. However, most part of this space requirement is attributed to, for example, the display of a spectrum analyzer which shows the result of measurement. The size of the system can therefore be reduced if it is allowed to limit what and how to observe for frequency response measurement.

Another important aspect of the monitoring system is the transmission loss that a high-frequency signal will experience when it passes through some additional circuits attached for the purpose of monitoring. While the amount of loss may depend on what frequency range is used or how the circuit is configured, the presence of loss often becomes a real problem when the quality of signals is critical. For example, a typical transmission line circuit made of ordinary conductors, together with its accompanying high-frequency connection medium such as coaxial cables, will reduce the signal level by a few tenths to several decibels at both input and output ends of a high-frequency circuit being monitored. In the case of superconductor-based digital circuits using Josephson junctions, the insertion loss of additional circuits eventually reduces their fan-outs. Also, analog circuits handling small signals would encounter a problem of low input levels when insertion loss is present. In high-power analog circuits, the monitoring circuits waste their output power. Further, a directional coupler with a large coupling factor often causes a problem of distortion or loss of input and output signals of the high-frequency circuit to which the coupler is attached.

SUMMARY OF THE INVENTION

In view of the foregoing, it is an object of the present invention to provide a system and method for monitoring a high-frequency circuit which minimize the insertion loss of additional monitoring circuits, while requiring only a small space.

To accomplish the above object, according to the present invention, there is provided a monitoring system for a circuit that operates at high frequencies and low temperatures to handle an electrical signal having high-frequency spectral components. This monitoring system comprises an input coupler, a high-frequency circuit, and an output coupler. The input coupler has a space where a given high-frequency probing signal can propagate, and it combines this propagating signal with a given electrical input signal, thus producing a combined signal. The high-frequency circuit applies a prescribed processing function to the combined signal supplied from said input coupler. The frequency response of this high-frequency circuit is what the monitoring system is supposed to observe. The output coupler receives the combined signal processed by the high-frequency circuit. It has a space where a high-frequency probing signal component in the received combined signal can propagate. The output coupler extracts this signal component for the purpose of monitoring.

Further, to accomplish the above object, according to the present invention, there is provided a method of monitoring a high-frequency circuit that operates at a low temperature to handle an electrical signal having high-frequency spectral components. This method comprises the steps of: (a) providing an input coupler at an input end of the high-frequency circuit, the input coupler having a space where a given high-frequency probing signal can propagate; (b) combining the propagating high-frequency probing signal and a given electrical input signal into a combined signal; (c) entering the combined signal to the high-frequency circuit; (d) providing an output coupler at an output end of the high-frequency circuit to receive the combined signal therefrom, the output coupler having a space where a high-frequency probing signal component in the received combined signal can propagate; and (e) extracting the high-frequency probing signal component that has propagated through the space in the output coupler.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
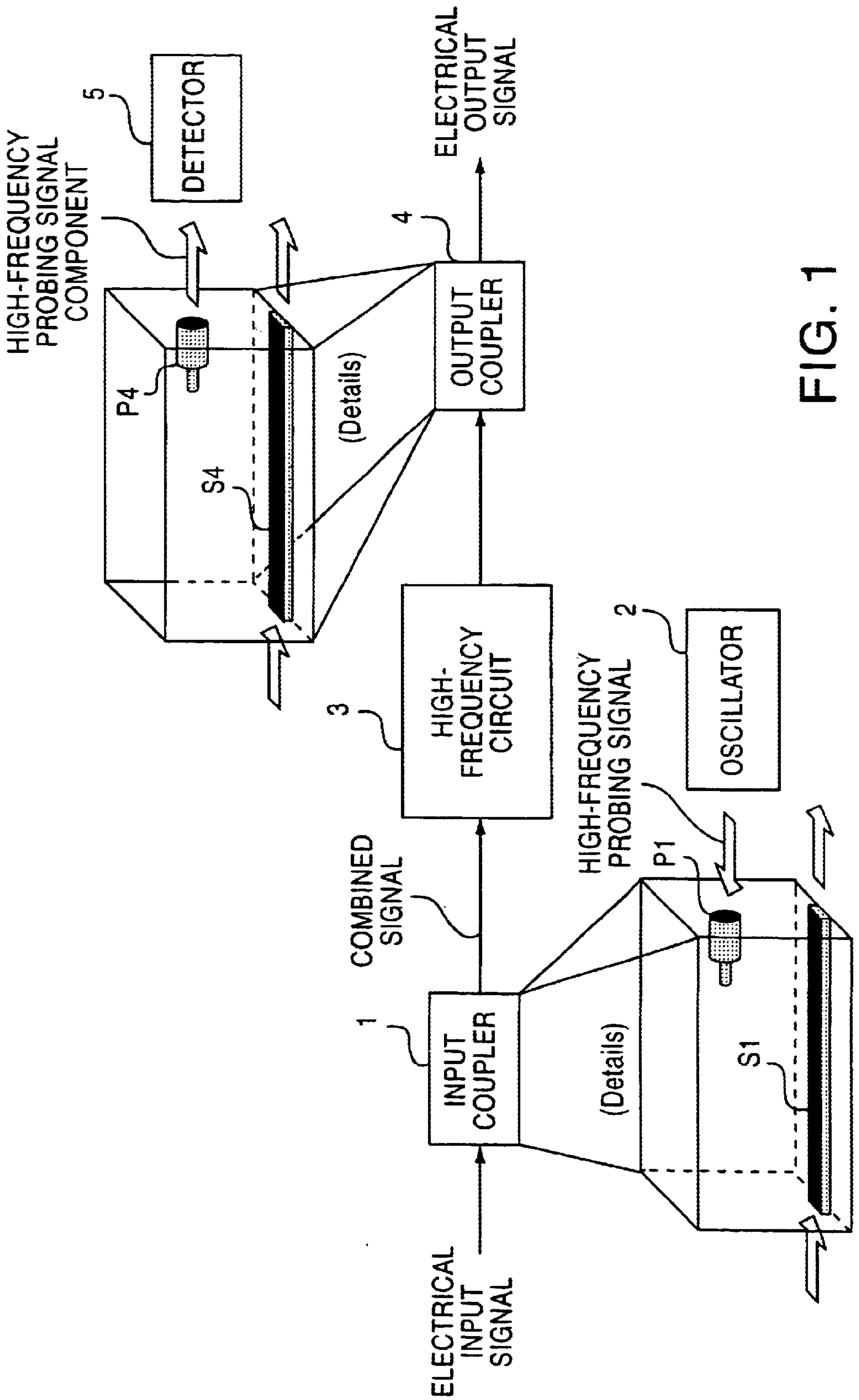
FIG. 1 is a conceptual view of a high-frequency circuit monitoring system according to the present invention.

Preferred embodiments of the present invention will be described below with reference to the accompanying drawings, wherein like reference numerals refer to like elements throughout.

FIG. 1 is a conceptual view of a high-frequency circuit monitoring system according to the present invention. This monitoring system is applied to, for example, high-frequency circuits that are designed to operate at low temperatures to handle electrical signals in the spectral range of quasi-microwaves, microwaves, or millimeter waves. Note that the term "low temperatures" refers to cryogenic temperatures below the critical temperature of a superconductor (e.g., 80 K or lower).

As can be seen in FIG. 1, the monitoring system comprises an input coupler 1, an oscillator 2, a high-frequency circuit 3, an output coupler 4, and a detector 5. Briefly, those elements function as follows. The oscillator 2 produces a high-frequency probing signal. The input coupler 1 combines this high-frequency probing signal with a given electrical input signal, thus outputting a combined signal. The high-frequency circuit 3 applies a prescribed processing function to the combined signal supplied from the input coupler 1. This high-frequency circuit 3 is what the present monitoring system is supposed to observe. The output coupler 4, placed at the output end of the high-frequency circuit 3, extracts the high-frequency probing signal component from the processed combined signal, and the detector 5 detects that signal component.

FIG. 1 also shows the internal structure of the input and output couplers 1 and 4. The input coupler 1 has a planar transmission line S1 made of oxide superconductive material and a probe P1 with an open-ended antenna. Similarly, the output coupler 4 has a planar transmission line S4 made of oxide superconductive material and a probe P4 with an open-ended antenna. The following describes each of those elements in greater detail.

The input coupler 1 is coupled to the oscillator 2 and high-frequency circuit 3, receiving a high-frequency probing signal from the former and supplying the latter with a combined signal. Specifically, the input coupler 1 provides a signal path circuit formed as a planar transmission line S1 using oxide superconductive material, which carries a given electrical input signal. This superconductor-based signal path circuit is supposed to have little insertion loss. It is therefore preferable to use an oxide superconductive material containing rare-earth elements or copper, the critical temperature of which is several tens of kelvins. The input coupler 1 also has a probe P1 placed near the planar transmission line S1. The probe P1 has an open-ended antenna that is shorter than a quarter wavelength of the maximum monitoring frequency. This antenna is fed a high-frequency probing signal that is produced by the oscillator 2.

The planar transmission line S1 is, for example, a microstrip line positioned over a wide ground plane (FIG. 1 does not show this ground plane for simplicity of illustration). The given electrical input signal travels along the planar transmission line Si toward the input end of the high-frequency circuit 3, during which the high-frequency probing signal transmitted from the probe P1 is mixed with the input signal through the spatial coupling between the probe P1 and planar transmission line S1. The resultant combined signal will thus contain two signal components, the input signal and probing signal. Some types of high-frequency circuit 3 may have no particular input signals. In such cases, the input coupler 1 serves as a means of supplying only the high-frequency probing signal to the high-frequency circuit 3 being monitored.

As already mentioned, the oscillator 2 is coupled to the input coupler 1. The oscillator 2 generates a high-frequency probing signal and sends it to the probe P1 so that the signal wave will be emitted into the inside space of the input coupler 1.

The high-frequency circuit 3 offers a prescribed processing function for its input signal. According to the present invention, it receives an electrical input signal through the input coupler 1, and the processed signal is sent out through the output coupler 4. The frequency response of this high-frequency circuit 3 in processing the given input signal is what the monitoring system of the present invention is observing. The signal given to the high-frequency circuit 3 is actually a combined signal containing a high-frequency probing signal component in addition to the intended input signal.

The output coupler 4 is placed at the output end of the high-frequency circuit 3 to receive the high-frequency probing signal component as part of the combined signal that appears at that output. More specifically, the output coupler 4 has a signal path circuit formed as a planar transmission line S4 using oxide superconductive material. Preferably the material contains rare-earth elements, copper, or other substances in order to minimize its insertion loss. Placed near the planar transmission line S4 is a probe P4, which has an open-ended antenna shorter than a quarter wavelength of the maximum monitoring frequency.

The combined signal (or the high-frequency probing signal in the case where no particular electrical input signal is given to the high-frequency circuit 3) travels along the planar transmission line S4 toward its output end. During this process, the high-frequency probing signal component propagates in the inner space of the output coupler 4 and reaches the probe P4. The signal wave appearing at the probe P4 is then detected by the detector 5.

As can be seen from the above, the proposed monitoring system monitors the frequency response of the high-frequency circuit 3 of interest, using an oxide superconductor-based planar transmission line that is placed at the output end (and also at the input end, if necessary) of the high-frequency circuit 3 to provide a signal path circuit for monitoring purposes. The monitoring system also employs a probe P4 near the transmission line, with an open-ended antenna whose length is less than a quarter wavelength of the highest-frequency wave used in monitoring. Further, the system has an oscillator to supply the input-side probe P1 with test frequencies, and a detector 5 to detect the signal that is processed by the high-frequency circuit 3 and appears at the output-side probe P4. The input-side components, however, may be omitted from the system when the high-frequency circuit 3 operates with no particular electrical signal inputs, or when it operates with an input signal having a periodic nature, which permits the monitoring algorithm to neglect temporal variations in the frequency spectrum of the signal.

The input coupler 1, as well as output coupler 4, may use ordinary conductive metals such as copper, silver, gold, or aluminum as material for its transmission lines. Preferably, however, the proposed monitoring system uses copper-oxide superconductive epitaxial films for that purpose. This choice of material reduces the loss of input and output signals passing through the transmission lines, compared to those made of the ordinary metal materials mentioned above.

To minimize the distortion or loss of the input and output signals, it is desirable to make the coupling factor of the input and output couplers 1 and 4 as small as possible. For this reason, the proposed monitoring system employs probes P1 and P4 with an open-ended antenna, each of which is placed near the superconductive transmission line. The antennas are designed to have a length of less than a quarter wavelength of the highest-frequency of the spectrum that is monitored. The transmission line and probe are housed in a metallic enclosure for the purpose of shielding.

The system will be able to monitor the high-frequency circuit 3 without affecting its input and output signals if the coupling factors of the input and output couplers 1 and 4 are as low as −20 dB (i.e., one hundredth) or below. This condition can be achieved by arranging their antennas with an appropriate offset and orientation relative to the transmission lines. Take the input coupler 1 for example. The electric field coupling between the probe P1 and transmission line S1 depends on the angle between their respective longitudinal axes, and it becomes the minimum when that angle is 90 degrees. Another thing that affects the probe's coupling factor is the length of the open-ended antenna. The proposed antenna design sets the length to less than a quarter wavelength, whose resonance frequency is not exactly equal to the intended signal wave's. The antenna configured as such will be less sensitive to signal wavelengths, besides having capacitive coupling characteristics. It also contributes to reduction of the time required for layout design of probes P1 and P4. While we have discussed the input coupler 1, the same applies to the output coupler 4.

As mentioned earlier, some types of high-frequency circuits operate with no particular electrical input signals. In this case, the monitoring system can observe the behavior of those circuits by simply detecting a high-frequency probing signal component in their outputs. In the other cases (i.e., when there is an input signal), the monitoring system may have to use an application-specific method that suits each particular type of high-frequency circuits. The following will give several examples of such detection methods:

(1) When monitoring a bandpass filter with sharp roll-off characteristics, the frequency of the probing signal has to be selected from an appropriate spectral range, at least other than the passband of the filter. The oscillator 2 should be designed to produce a sine wave signal or comb signal with a magnitude of −20 dB or smaller for the monitoring purpose, and this probing signal is supplied to the bandpass filter through a probe P1 placed at its input end. The probing signal is then detected at another probe P4 placed at the output end of the bandpass filter that is being monitored.

(2) A time-sharing technique, if applicable, may be used to enter a probing signal. That is, the monitoring system switches between the input signal and probing signal at certain intervals.

(3) In the case where the input signal is a code-division multiple access (CDMA) signal, the monitoring system employs a CDMA signal generator to produce a code-modulated probing signal which is orthogonal to the input signal.

With the above-described circuit structure, the proposed monitoring system analyzes the output of the detector 5 in synchronization with the frequency sweep performed by the source of the probing signal. The result of this analysis represents the amplitude response (or magnitude frequency response) of the high-frequency circuit 3.

Figure 2:
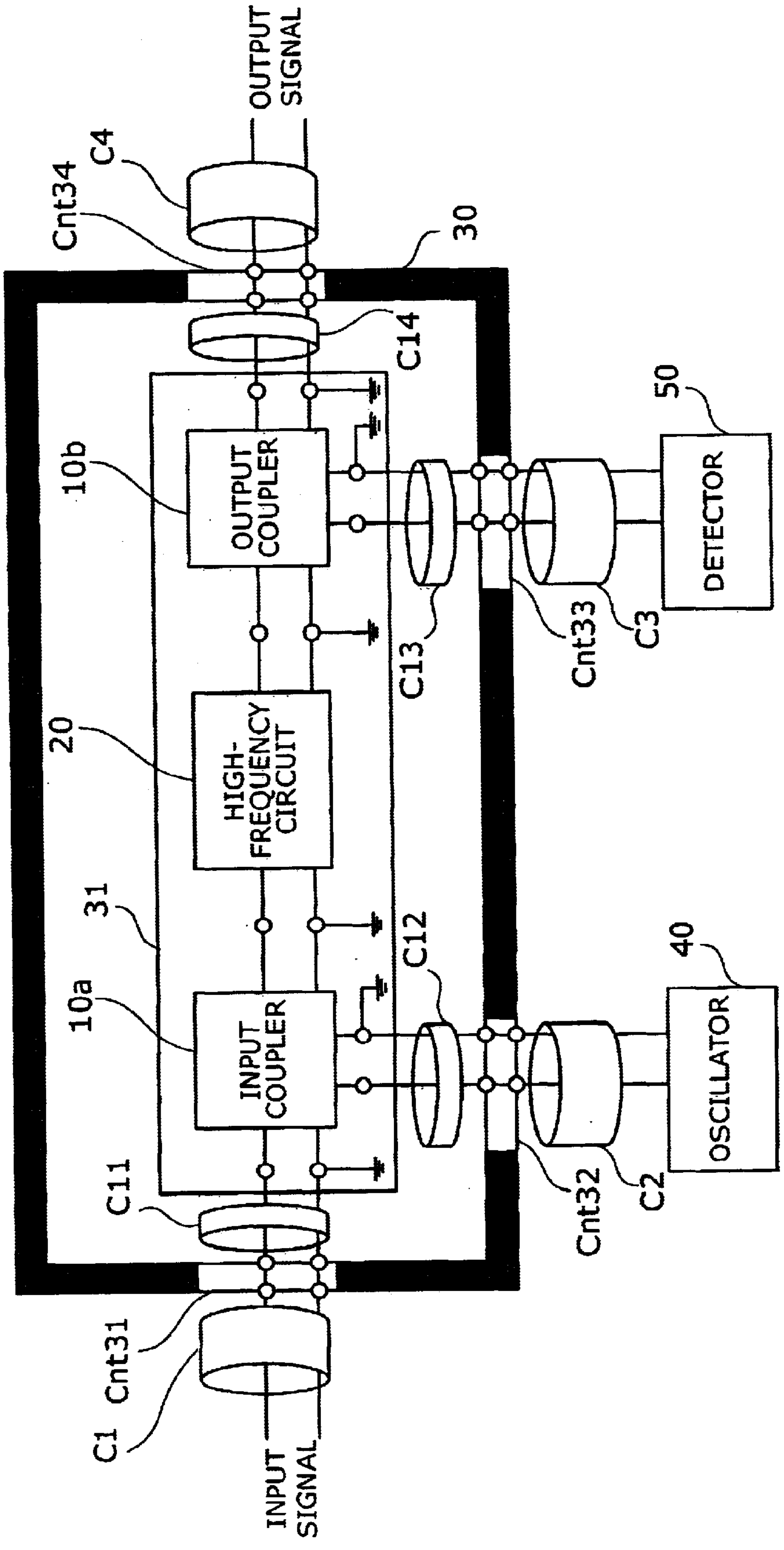
FIG. 2 is a simplified circuit diagram of the monitoring system shown in FIG. 1.

FIG. 2 is a simplified circuit diagram of a high-frequency circuit monitoring system according to the present invention, whose concept has been discussed in FIG. 1. It is supposed here in FIG. 2 that the high-frequency circuit of interest is a circuit block with a single input port and a single output port and it operates at a temperature of about 70 K. Small circles on the signal lines represent the contacts of mating coaxial connectors, each pair consisting of a signal pin and a ground conductor.

The system of FIG. 2 comprises an input coupler 10*a*, an output coupler 10*b*, a high-frequency circuit 20 being monitored, a cryostat heat-insulated housing 30, a voltage-controlled oscillator 40, and a detector 50. There are several electrical signal connections coming in and out of the heat-insulated housing 30, which include outside coaxial cables C1 to C4 and inside coaxial cables C11 to C14. They are all semi-rigid cables. Hermetically sealed coaxial connectors Cnt31 to Cnt34 are used to join the outside coaxial cables C1 to C4 to their corresponding inside coaxial cables C11 to C14, respectively.

The oscillator 40 produces a high-frequency continuous wave (CW) signal, the frequency of which can be varied continuously in the range of 1.9 to 2.1 GHz according to a control voltage supplied from an external source. While not shown in FIG. 2, a sawtooth wave with a sweep frequency of 1 to 10 Hz is supplied to the oscillator 40 as its control voltage. Further, the oscillator 40 has an output switching function that turns on or off the high-frequency CW signal. An isolator (not shown) is placed at the output of the oscillator 40. The oscillator 40 also outputs a dc voltage for use in an outside circuit as a signal synchronized with the frequency sweeping operation.

While not shown in detail in FIG. 2, the detector 50 is actually a semiconductor diode detector circuit with an isolator placed at its input port. The probing signal appearing at the output coupler 10*b* is routed to the detector circuit through the input isolator.

The cryostat heat-insulated housing 30 is a vacuum container with stainless steel walls, the inner space of which is evacuated down to $10^{-3}$ Torr or below during its operation. A cryogenic facility is provided for the purpose of low-temperature operation of the high-frequency circuit 3, although most of its components are omitted from FIG. 2. Specifically, a cooling stage 31 is placed inside the heat-insulated housing 30, which is coupled to the cold end of a cryocooler (not shown). The temperature of this cooling stage should be maintained in a range between 60 K and 70 K when the circuit is in operation.

In the following section, we will provide more details about the input coupler 10*a* and output coupler 10*b* shown in FIG. 2. For simplicity of explanation, those two couplers 10*a* and 10*b* will be referred to collectively as the "coupler" 10.

Figure 3:
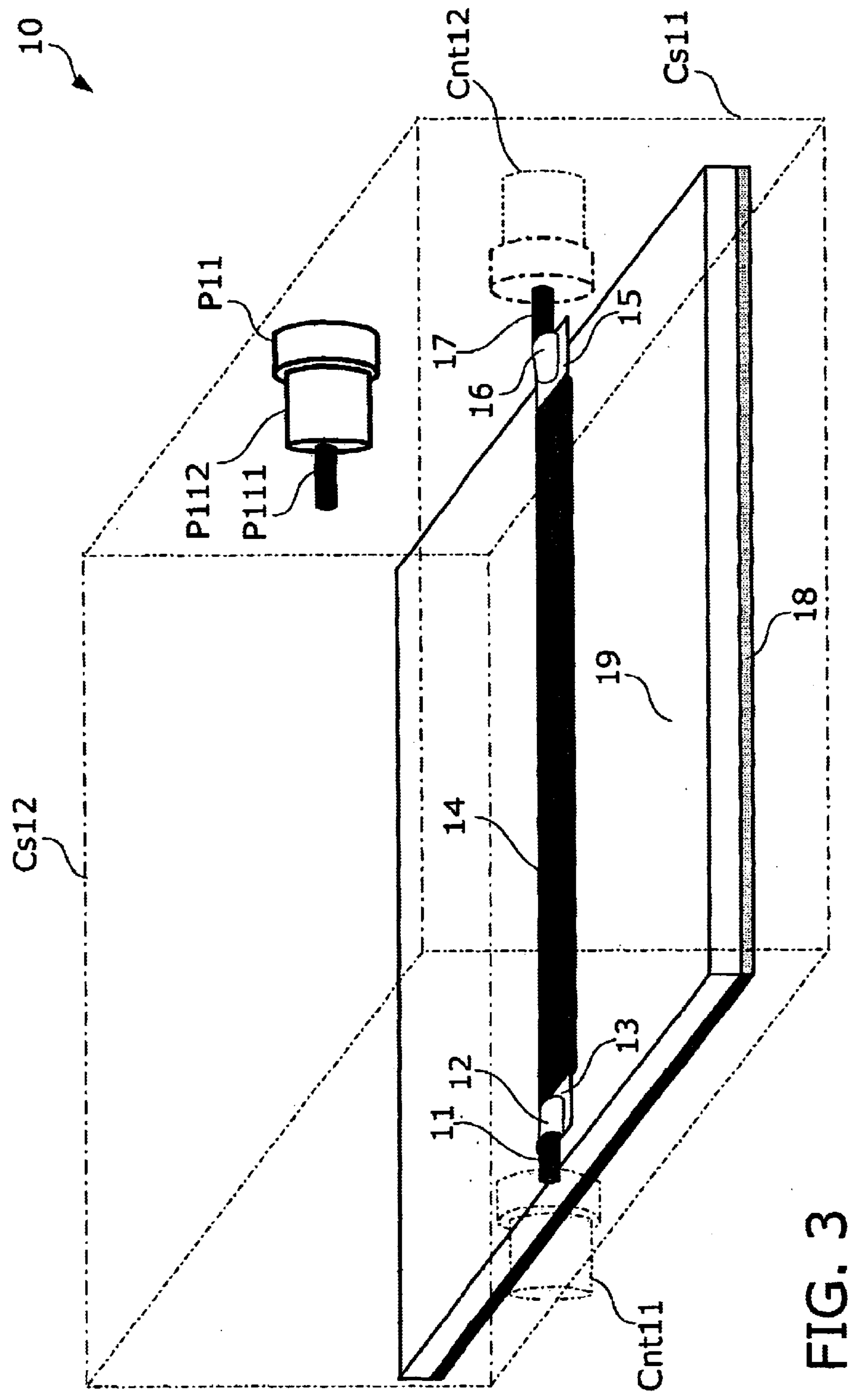
FIG. 3 shows a structure of a coupler.
Figure 4:
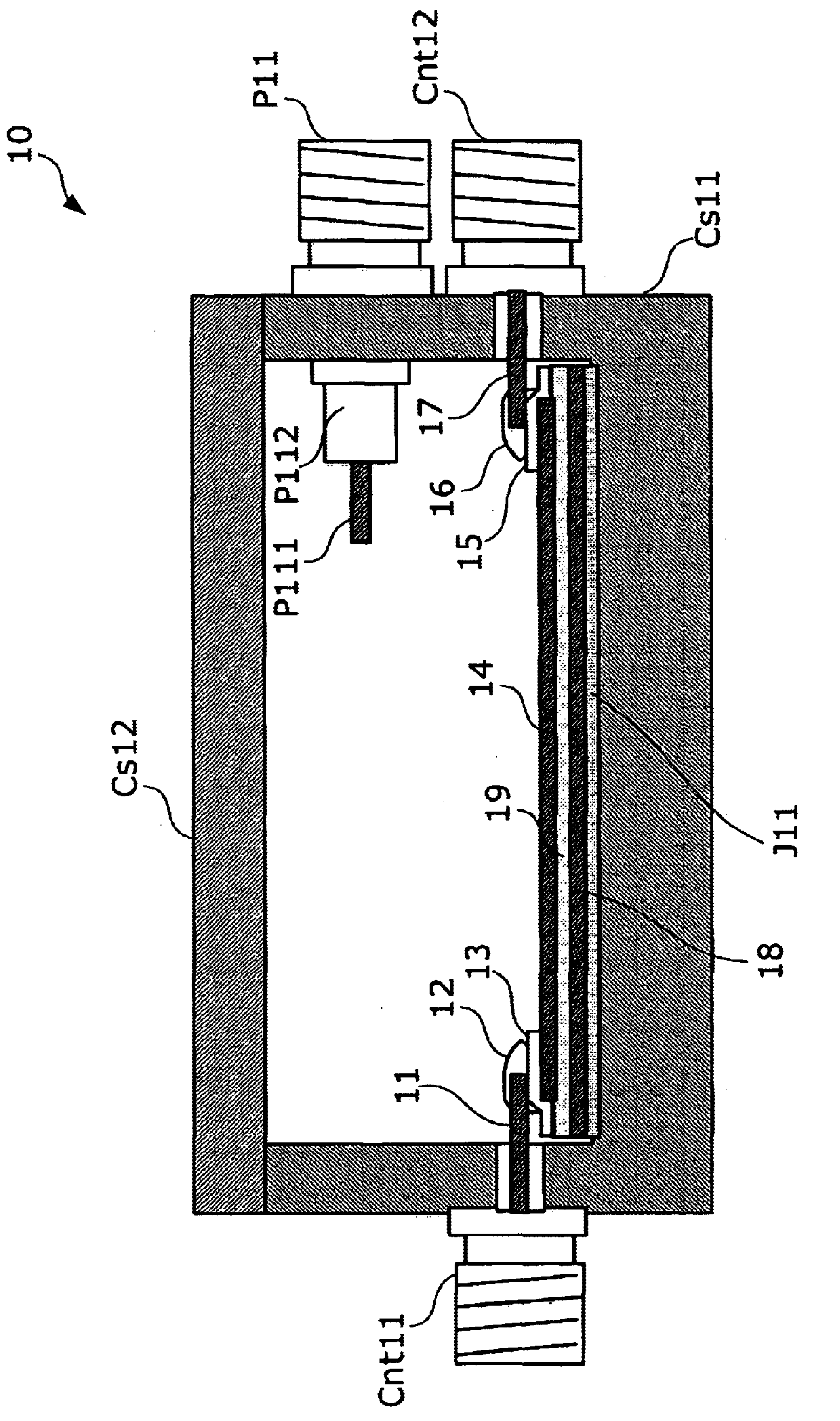
FIG. 4 is a side sectional view of the coupler shown in FIG. 3.

FIG. 3 shows a structure of a coupler 10, and FIG. 4 gives its side sectional view. This coupler 10 has a metal enclosure composed of a case Cs11 and a lid Cs12. A dielectric substrate 19 is placed on the bottom of the case Cs11. This dielectric substrate 19 has a superconductive ground plane 18 formed on its bottom side, which is fixed to the case Cs11 using a bonding material J11. The dielectric substrate 19 also has a superconductive wiring pattern 14 on its top surface. Placed on the sidewalls of the case Cs11 are coaxial connectors Cnt11, Cnt12, and P11 for use in connecting coaxial cables. The following describes each of those elements in greater detail.

The superconductive wiring pattern 14 is a 0.5 mm wide circuit pattern of a high-temperature oxide superconductor film (e.g., $YBa_2Cu_3O_{7-\delta}$ film with a thickness of 0.4 μm to 1 μm). One end of this pattern 14 is connected to the center contact 11 of a coaxial connector Cnt11 via a joint 12 and an electrode film 13. Likewise, the other end of the superconductive wiring pattern 14 is connected to the center contact 17 of aonther coaxial connector Cnt12 via a joint 16 and an electrode film 15.

The superconductive ground plane 18 is also a high-temperature oxide superconductor film (e.g., $YBa_2Cu_3O_{7-\delta}$ film with a thickness of 0.4 μm to 1 μm). The dielectric substrate 19 is, for example, a monocrystalline MgO substrate with a thickness of 0.5 mm, so that a superconductive film will grow on an MgO(100) surface. Preferably, the material for the dielectric substrate 19 contains at least one of the following substances: magnesium oxide, cerium oxide-coated sapphire, strontium titanate, lanthanum aluminate, and magnesium titanate.

The bonding material J11 is an indium sheet for use in fixing the dielectric substrate 19 on a surface of the case Cs11, such that its superconductive ground plane 18 will contact well with the case Cs11 in terms of thermal conductivity.

Yet another coaxial connector P11 is joined with an outer conductor P112 of the semi-rigid coaxial cable, which gives an electrical connection to the ground. Protruding out of it is the central conductor of the coaxial cable, which serves as a probe antenna in cooperation with the outer conductor P112. The length of this central conductor P111 measured from the end of the outer conductor P112 is less than a quarter wavelength of an intended signal frequency. The combination of the coaxial connector P11, central conductor P111, and outer conductor P112 is what has been referred to as the probe P1 or P4 in FIG. 1.

Preferably, the superconductive material used in the present invention is an oxide superconductor containing rare-earth elements or copper or both. Preferably, it includes at least one of the following materials:

$Bi_{n1}Sr_{n2}Ca_{n3}Cu_{n4}O_{n5}$
$(1.8 \leqq n1 \leqq 2.2,\ 1.8 \leqq n2 \leqq 2.2,\ 0.9 \leqq n3 \leqq 1.2,\ 1.8 \leqq n4 \leqq 2.2,\ 7.8 \leqq n5 \leqq 8.4)$ $Pb_{k1}Bi_{k2}Sr_{k3}Ca_{k4}Cu_{k5}O_{k6}$
$(1.8 \leqq k1+k2 \leqq 2.2,\ 0 \leqq k1 \leqq 0.6,\ 1.8 \leqq k3 \leqq 2.2,\ 1.8 \leqq k4 \leqq 2.2,\ 1.8 \leqq k5 \leqq 2.2,\ 9.5 \leqq k6 \leqq 10.8)$ $Y_{m1}Ba_{m2}Cu_{m3}O_{m4}$
$(0.5 \leqq m1 \leqq 1.2,\ 1.8 \leqq m2 \leqq 2.2,\ 2.5 \leqq m3 \leqq 3.5,\ 6.6 \leqq m4 \leqq 7.0)$ $Nd_{p1}Ba_{p2}Cu_{p3}O_{p4}$
$(0.5 \leqq p1 \leqq 1.2,\ 1.8 \leqq p2 \leqq 2.2,\ 2.5 \leqq p3 \leqq 3.5,\ 6.6 \leqq p4 \leqq 7.0)$ $Nd_{q1}Y_{q2}Ba_{q3}Cu_{q4}O_{q5}$
$(0 \leqq q1 \leqq 1.2,\ 0 \leqq q2 \leqq 1.2,\ 0.5 \leqq q1+q2 \leqq 1.2,\ 1.8 \leqq q2 \leqq 2.2,\ 2.5 \leqq q3 \leqq 3.5,\ 6.6 \leqq q4 \leqq 7.0)$ $Sm_{p1}Ba_{p2}Cu_{p3}O_{p4}$
$(0.5 \leqq p1 \leqq 1.2,\ 1.8 \leqq p2 \leqq 2.2,\ 2.5 \leqq p3 \leqq 3.5,\ 6.6 \leqq p4 \leqq 7.0)$ $Ho_{p1}Ba_{p2}Cu_{p3}O_{p4}$
$(0.5 \leqq p1 \leqq 1.2,\ 1.8 \leqq p2 \leqq 2.2,\ 2.5 \leqq p3 \leqq 3.5,\ 6.6 \leqq p4 \leqq 7.0)$ Consider the case where the above monitoring system operates at frequencies in 2 GHz band. The input coupler 10*a* and output coupler 10*b* of this monitoring system have inside dimensions of about 3 cm wide by 3 cm deep by 2 cm high. We can set their coupling factors to −20 dB or below by tuning the probe antenna length, for example. When this is applied to a low-temperature high-frequency circuit 20 operating at about 70 K, the transmission loss of the couplers, including their respective package loss and connector loss, can be reduced to the level of 0.1 to 0.2 dB in the frequency range around 2 GHz. This level of loss is small enough for us to use it for in-situ monitoring of the amplitude response of the high-frequency circuit 20.

By activating its own oscillator, the proposed monitoring system can also serve as an in-system test facility for a high-frequency circuit. Think of, for example, a superconductive film-based tunable bandpass filter with a passband around 2 GHz. When combined with this filter, the proposed monitoring system identifies the magnitude frequency response of the filter in question and determines whether its tuning control is working as intended.

The present invention can also work as part of a control system for a high-frequency circuit 20. In this case the detector 5 of the monitoring system supplies its probing signal output to a controller in order to correct the high-frequency circuit 20 or its signals.

Further, the present invention can be used to monitor not only high-frequency circuits, but also high-Q devices such as filter circuits.

The above discussion will now be summarized below. According to the present invention, the input coupler has a planar transmission line made of oxide superconductive material to carry a given electrical input signal. This signal is combined with a high-frequency probing signal propagating in the inside space of the coupler, and the resulting combined signal is supplied to the high-frequency circuit of interest. The output coupler extracts a probing signal component out of the combined signal by receiving a wave propagating in the inside space of the coupler. Besides reducing the insertion loss of additional monitoring circuits, the present invention permits us to build a monitoring system in a smaller space.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A monitoring system for a circuit that operates at high frequencies and low temperatures to handle an electrical signal having high-frequency spectral components, comprising:

an input coupler having a space where a given high-frequency probing signal can propagate, which combines the propagating high-frequency probing signal with a given electrical input signal, thus producing a combined signal;

a high-frequency circuit which applies a prescribed processing function to the combined signal supplied from said input coupler; and an output coupler, coupled to said high-frequency circuit to receive the combined signal therefrom, which has a space where a high-frequency probing signal component in the received combined signal can propagate and extracts the high-frequency probing signal component having propagated therethrough.

2. The monitoring system according to claim 1, wherein said input coupler comprises:

a planar transmission line using oxide superconductive material to carry the given electrical input signal; and a probe with an open-ended antenna placed near said planar transmission line, the open-ended antenna being shorter than a quarter wavelength of an intended maximum monitoring frequency.

3. The monitoring system according to claim 2, wherein said planar transmission line is formed on a substrate that is made of at least one of magnesium oxide, cerium oxide-coated sapphire, strontium titanate, lanthanum aluminate, and magnesium titanate.

4. The monitoring system according to claim 2, wherein the oxide superconductive material contains a rare-earth element.

5. The monitoring system according to claim 2, wherein the oxide superconductive material is a copper-oxide superconductor.

6. The monitoring system according to claim 1, wherein said output coupler comprises:

a planar transmission line using oxide superconductive material to carry the combined signal received from the high-frequency circuit; and a probe with an open-ended antenna placed near said planar transmission line, the open-ended antenna being shorter than a quarter wavelength of an intended maximum monitoring frequency.

7. The monitoring system according to claim 6, wherein the oxide superconductive material contains a rare-earth element.

8. The monitoring system according to claim 6, wherein the oxide superconductive material is a copper-oxide superconductor.

9. The monitoring system according to claim 6, further comprising a detector that detects the high-frequency probing signal component extracted by said output coupler.

10. The monitoring system according to claim 9, wherein said detector comprises a semiconductor diode to receive the output of said probe.

11. The monitoring system according to claim 1, further comprising an oscillator that produces and supplies the high-frequency probing signal to said input coupler.

12. The monitoring system according to claim 11, wherein said oscillator is a variable frequency oscillator that produces the high-frequency probing signal by sweeping operating frequency range of the high-frequency circuit being monitored.

13. A method of monitoring a high-frequency circuit that operates at a low temperature to handle an electrical signal having high-frequency spectral components, comprising the steps of:

providing an input coupler at an input end of the high-frequency circuit, the input coupler having a space where a given high-frequency probing signal can propagate;

combining the propagating high-frequency probing signal and a given electrical input signal into a combined signal;

entering the combined signal to the high-frequency circuit which applies a prescribed processing function;

providing an output coupler at an output end of the high-frequency circuit to receive the combined signal therefrom, the output coupler having a space where a high-frequency probing signal component in the received combined signal can propagate; and extracting the high-frequency probing signal component that has propagated through the space in the output coupler.

14. The method according to claim 13, wherein the input coupler comprises:

a planar transmission line using oxide superconductive material to carry the given electrical input signal; and a probe with an open-ended antenna placed near said planar transmission line, the open-ended antenna being shorter than a quarter wavelength of an intended maximum monitoring frequency.

15. The method according to claim 14, wherein the oxide superconductive material contains a rare-earth element.

16. The method according to claim 14, wherein the oxide superconductive material is a copper-oxide superconductor.

17. The method according to claim 14, wherein the planar transmission line is formed on a substrate that is made of at least one of magnesium oxide, cerium oxide-coated sapphire, strontium titanate, lanthanum aluminate, and magnesium titanate.

18. The method according to claim 13, wherein the output coupler comprises:

a planar transmission line using oxide superconductive material to carry the combined signal received from the high-frequency circuit; and a probe with an open-ended antenna placed near said planar transmission line, the open-ended antenna being shorter than a quarter wavelength of an intended maximum monitoring frequency.

19. The method according to claim 18, further comprising the steps of providing a detector to detect the high-frequency probing signal component extracted by the output coupler.

20. The method according to claim 19, wherein the detector comprises a semiconductor diode to receive the output of the probe.

21. The method according to claim 13, further comprising the step of providing an oscillator which produces and supplies the high-frequency probing signal to the input coupler.

22. The method according to claim 21, wherein the oscillator is a variable frequency oscillator that produces the high-frequency probing signal by sweeping operating frequency range of the high-frequency circuit being monitored.

* * * * *